United States Patent
Ma et al.

(10) Patent No.: US 9,115,015 B2
(45) Date of Patent: Aug. 25, 2015

(54) ADVANCED TREATMENT METHOD OF FEED WATER BY COMBINATION OF METAL ZINC AND OZONE

(75) Inventors: Jun Ma, Harbin (CN); Shengjun Wang, Harbin (CN); An Li, Harbin (CN)

(73) Assignee: Harbin Institute of Technology, Harbin, Heilongjiang Province (CN)

( * ) Notice: Subject to any disclaimer, the term of this patent is extended or adjusted under 35 U.S.C. 154(b) by 343 days.

(21) Appl. No.: 13/512,600

(22) PCT Filed: Dec. 30, 2009

(86) PCT No.: PCT/CN2009/076225
§ 371 (c)(1),
(2), (4) Date: May 30, 2012

(87) PCT Pub. No.: WO2011/063576
PCT Pub. Date: Jun. 3, 2011

(65) Prior Publication Data
US 2012/0228237 A1    Sep. 13, 2012

(30) Foreign Application Priority Data
Nov. 30, 2009    (CN) .......................... 2009 1 0310659

(51) Int. Cl.
*C02F 1/72*    (2006.01)
*C02F 1/78*    (2006.01)
*B01J 23/06*    (2006.01)
*C02F 1/70*    (2006.01)

(52) U.S. Cl.
CPC . *C02F 1/78* (2013.01); *B01J 23/06* (2013.01); *C02F 1/705* (2013.01); *C02F 1/725* (2013.01); *C02F 2305/023* (2013.01)

(58) Field of Classification Search
CPC ............ C02F 1/705; C02F 1/725; C02F 1/78; C02F 2201/78; C02F 2201/784; C02F 2305/02; C02F 2305/023; C02F 2305/026; B01J 23/06
See application file for complete search history.

(56) References Cited

U.S. PATENT DOCUMENTS 6,254,894 B1 *   7/2001   Denkewicz et al. .......... 424/618
2003/0131439 A1 *   7/2003   Wen ................................ 15/344

* cited by examiner

*Primary Examiner* — Lucas Stelling
(74) *Attorney, Agent, or Firm* — Novoclaims Patent Services LLC; Mei Lin Wong

(57) ABSTRACT

An advanced treatment method of feed water by combination of metal zinc and ozone is provided. The advanced treatment method of feed water comprises putting metal zinc into an ozone contact reactor, adding water to be treated into the reactor at a flow rate of 1-50 m/h, at the same time, introducing ozone into the water such that the ozone, the metal zinc and the water can be contacted with each other fully. The hydraulic retention time of the water to be treated in the reactor is 1-200 min. The amount of the ozone which is introduced into the water to be treated is 0.1-100 mg per liter water. During the water treatment process of the invention, the metal ions cannot be lost, the secondary pollution cannot be caused, and the preparation technology is simple with low cost and good treatment effect.

13 Claims, No Drawings

ADVANCED TREATMENT METHOD OF FEED WATER BY COMBINATION OF METAL ZINC AND OZONE

BACKGROUND OF THE PRESENT INVENTION

1. Field of Invention

The present invention relates to an advanced treatment method for water.

2. Description of Related Arts

Recent industrial and agricultural developments have led to discharges of a large amount of industrial wastewater and domestic sewage into rivers, lakes and reservoirs. While these rivers, lakes and reservoirs are usually the water source of domestic water supply for local inhabitants, the wastewater discharge has aggravated the problem of organic pollution in the water source of drinking water. Some organic pollutants, such as chemical substances which include chemical raw materials, pesticides and plasticizers, are carcinogenic, teratogenic and mutagenic. The concentration of these substances is generally low in water but the presence of these substances is extremely harmful to health because of their high level of toxicity. Conventional water treatment methods have very limited effect on the removal of these substances. For example, in Nov. 13, 2005, an accident occurred in Jilin, China. A diphenyl factory owned by China National Petroleum Corporation exploded and led to a massive nitrobenzene pollution in the Songhua River and the emergency use of activated carbon powder. This activated carbon powder provided strengthened adsorption for coagulation so that the emergency use of activated carbon powder is required to ensure the safety of drinking water because the conventional water treatment has very poor nitrobenzene removal effect on water. However, activated carbon has a problem of saturated adsorption capacity and has to be regenerated after its adsorption capacity is saturated. Hence, the cost of the use of activated carbon powder is relatively high. For removal of this type of organic substances, ozonation is another possible method. However, because of the limited ability of ozonation in which only a selective portion of the easily oxidized organic substances containing benzene ring or double bond structure can be removed, the removal of organic pollutants which are highly stable and hard-to-degrade are very difficult to achieve to the extent of complete mineralization. In order to enhance the effect of ozone on the removal of organic pollutants in water, catalytic ozonation is employed. It is generally accepted that this method can effectively remove the organic pollutants in water by promoting the decomposition of ozone in water and producing strong oxidizing hydroxyl radicals. Common catalytic processes include homogeneous catalytic ozonation which utilizes metal ions as the catalyst and heterogeneous catalytic ozonation which utilizes metal oxides and supported noble metals as the catalyst. However, the common catalytic processes also have the following drawbacks. For homogeneous catalytic ozonation, the metal ions are dissolved in water and are lost with the water flow, therefore causing secondary pollution. For heterogeneous catalytic ozonation, the metal oxides are usually in powder form and have to be supported by other materials in order to prevent loss with water flow, therefore complicated manufacturing process and higher manufacture cost are involved while the problems of low catalytic efficiency and dissolution of metal ions have adversely affected the water quality and treatment result. The supported noble metal catalyst involves high manufacturing cost and is not suitable for large-scale application. At present, there is also water treatment method for removal of organic pollutants by a combination use of metal and ozone. For example, in Chinese patent application number 20081006448.7, a method of removing organic substance in water by catalytic ozonation was disclosed in which the catalyst makes use of a mixture of zerovalent iron and filler material. However, the catalytic ozonation process produces ferric ion which causes the treated water to turn yellowish, hence adversely affects the sensory properties of water and produces poor water treatment result.

SUMMARY OF THE PRESENT INVENTION

An object of the present invention is to provide an advanced treatment method of water by combination of metal zinc and ozone so as to solve the existing problems in ozonation process which involves poor removal effect of organic pollutants, secondary pollution easily caused by the use of catalyst in catalytic ozonation, complicated manufacture process, high cost and poor treatment result.

Additional advantages and features of the invention will become apparent from the description which follows, and may be realized by means of the instrumentalities and combinations particular point out in the appended claims.

According to the present invention, the foregoing and other objects and advantages are attained by an advanced treatment method of water by a combination of metal zinc and ozone, comprising the steps of: placing metal zinc into an ozone contact reactor; and introducing water subject to treatment into the reactor at a flow rate of 1~50 m/h while at the same introducing ozone to the water subject to treatment so that the ozone, the metal zinc and the water contact adequately, wherein a hydraulic retention time of the water subject to treatment in the reactor is 1~200 min and the amount of the ozone which is introduced into the water subject to treatment is 0.1-100 mg per liter water subject to treatment.

According to the preferred embodiment of the present invention, the metal zinc has a strip-like structure having a width of 1 cm~10 cm and a thickness of 1 mm~1 cm and is woven into a mesh structure having a grid size of 1 $cm^2$~100 $cm^2$; the metal zinc has a thread-like structure having a diameter of 1 μm~1 cm and is woven into a mesh structure having a grid size of 1 $mm^2$~100 $cm^2$; the metal zinc has a granular structure having a grain size of 1 mm~10 cm; and/or the metal zinc has a powder structure having a particle size of 10 μm~1 mm.

The principle of advanced treatment method for water according to the present invention is as follows: the present invention provides a method which utilizes a combination of metal zinc and ozone of which the metal zinc serves as a catalyst for rapid catalytic decomposition of ozone to produce strong oxidizing intermediates (such as hydroxyl radicals or peroxyl radicals) through redox reaction between the metal zinc and the ozone. These strong oxidizing intermediates are capable of oxidizing the organic pollutants in the water subject to treatment into water and carbon dioxide. At the same time, the metal zinc and the ozone produce zinc oxides and hydroxides on their surface respectively in such a manner that the zinc oxides and the hydroxides bind together to form an orderly 3-dimensional organized structure which has good dispersion properties without occurrence of agglomeration. The organized structure provides a large number of oxygen vacancies on its surface and many dangling bonds, therefore capable of bonding to the organic pollutants which is hard to oxidize and remove to form a mesh floc (bridging function). The mesh floc can further adsorb organic pollutants in water and increase the removal efficiency of organic pollutants in water. In addition, zinc oxides and hydroxides have larger surface area ratio and higher reactivity, and their catalytic and adsorption abilities are strong, therefore allowing further adsorption of organic pollutants and ozone in water, causing the increase in localized concentration of organic pollutants, accelerating the reaction between ozone and organic pollutants under catalysis of zinc oxides and hydroxides, enhancing the oxidation efficiency of ozone and facilitating the removal of organic pollutants in water.

The advanced treatment method of water by combination of metal zinc and ozone according to the preferred embodiment of the present invention has the following advantageous effect:

1. The metal zinc which is utilized in the present invention is readily available without special preparation, therefore the cost of treatment is lowered;

2. The advanced treatment method of water by combination of metal zinc and ozone of the present invention has high removal efficiency for organic pollutants and produces good treatment result. In addition, the water after treatment is clear and transparent with good looking perception. The treatment method of the present invention can achieve a removal rate or 90% or above for removal of nitrobenzene, chlorobenzoic acid, diethyl phthalate, dibutyl phthalate and p-chloronitrobenzene.

3. The advanced treatment method of water by a combination of metal zinc and ozone of the present invention can utilize metal zinc processed into different shapes or structures without imposing any support requirement and easily manufactured. The water after treatment is analyzed by zinc ion detector and the test result shows that the water after treatment does not contain zinc ion. Therefore it is indicated that the method of the present invention does not produce secondary pollution. Moreover, the metal zinc catalyst of the present invention can be recycled and re-used, which is cost saving.

4. The advanced treatment method of water by combination of metal zinc and ozone of the present invention employs simple steps and is easy to operate. It can also be used in conjunction with existing water treatment processes and is suitable and applicable for modification or upgrade of a variety of water treatment plants.

Still further objects and advantages will become apparent from a consideration of the ensuing description and drawings. These and other objectives, features, and advantages of the present invention will become apparent from the following detailed description, the accompanying drawings, and the appended claims.

DETAILED DESCRIPTION OF THE PREFERRED EMBODIMENT

The embodiment of the present invention as shown and described below is exemplary only and not intended to be limiting. Therefore, this invention includes all modifications or any combination encompassed within the spirit and scope of the followings.

Embodiment 1

The advanced treatment method for water by a combination of metal zinc and ozone according to this embodiment is realized by the following steps: placing metal zinc into an ozone contact reactor; and introducing water subject to treatment into the ozone contact reactor at a flow rate of 1~50 m/h while at the same to introducing ozone to the water subject to treatment so that the ozone, the metal zinc and the water subject to treatment are contacted adequately, wherein a hydraulic retention time of the water subject to treatment in the ozone contact reactor is 1~200 min and an amount of the ozone which is introduced into the water subject to treatment is 0.1-100 mg per liter of the water subject to treatment.

According to this embodiment, through controlling the flow rate of the water subject to treatment, the ozone, the metal zinc and the water subject to treatment are contacted adequately such that the ozone and the metal zinc have complete reaction.

According to this embodiment, the metal zinc is placed into the ozone contact reactor through a fixed-bed or a fluidized-bed arrangement. The ozone contact reactor is a tubular reactor, a tank reactor or a tower reactor.

According to this embodiment, the water subject to treatment is guided to flow into the reactor in a cocurrent manner, a countercurrent manner or a mixture of concurrent and countercurrent manner.

According to this embodiment, a removal efficiency of nitrobenzene, p-chlorobenzoic acid, diethyl phthalate, dibutyl phthalate and p-chloronitrobenzene from the water subject to treatment can reach 90% or above. The efficiency of advanced treatment method for water according to this embodiment is good. Compared to conventional ozonation method, the removal efficiency of nitrobenzene is increased by more than 60%, the removal efficiency of p-chlorobenzoic acid is increased by more than 85%, the removal efficiency of diethyl phthalate is increased by more than 90%, the removal efficiency of dibutyl phthalate is increased by more than 63%, and the removal efficiency of p-chloronitrobenzene is increased by more than 72%.

According to this embodiment, water after treatment is analyzed by a zinc ion analyzer and the test result shows that the water after treatment does not contain zinc ion. According to this embodiment, the ion dissolution problem does not exist and the water after treatment is clear and transparent with good sensory properties.

Embodiment 2

The embodiment 2 and the embodiment 1 have identical steps and parameters except that in the embodiment 2, the hydraulic retention time of the water subject to treatment in the ozone contact reactor is 30~120 min.

Embodiment 3

The embodiment 3 and the embodiments 1 and 2 have identical steps and parameters except that in the embodiment 3, the metal zinc has a strip-like structure having a width of 1 cm~10 cm and a thickness of 1 mm~1 cm, and an amount of metal zinc is 10~2000 g per liter of the water subject to treatment.

According to this embodiment, the catalyst is placed into the ozone contact reactor through a fixed-bed arrangement and is continuously or spacedly provided in the reactor.

Embodiment 4

The embodiment 4 and the embodiments 1 and 2 have identical steps and parameters except that in the embodiment 4, the metal zinc has a strip-like structure having a width of 1 cm~10 cm and a thickness of 1 mm~1 cm and is woven into a mesh structure having a grid size of 1 $cm^2$~100 $cm^2$, wherein an amount of metal zinc is 10~2000 g per liter of the water subject to treatment.

According to this embodiment, the catalyst is placed into the ozone contact reactor through a fixed-bed arrangement and is continuously or spacedly provided in the reactor.

Embodiment 5

The embodiment 5 and the embodiments 1 and 2 have identical steps and parameters except that in the embodiment 5, the metal zinc has a thread-like structure having a diameter of 1 μm~1 cm and is woven into a mesh structure having a grid size of 1 mm$^2$~100 cm$^2$, wherein an amount of metal zinc is 1~1000 g per liter of the water subject to treatment.

According to this embodiment, the catalyst is placed into the ozone contact reactor through a fixed-bed arrangement and is continuously or spacedly provided in the reactor.

Embodiment 6

The embodiment 6 and the embodiments 1 and 2 have identical steps and parameters except that in the embodiment 6, the metal zinc has a granular structure having a grain size of 1 mm~10 cm, wherein an amount of metal zinc is 1~1000 g per liter of the water subject to treatment.

According to this embodiment, the catalyst is placed into the ozone contact reactor through a fixed-bed or a fluidized bed arrangement. When a fixed-bed arrangement is used, the catalyst is continuously or spacedly provided in the reactor.

Embodiment 7

The embodiment 7 and the embodiments 1 and 2 have identical steps and parameters except that in the embodiment 7, the metal zinc has a powder structure having a particle size of 10 μm~1 mm, wherein an amount of metal zinc is 1 mg~10 g per liter of the water subject to treatment.

According to this embodiment, the catalyst is placed into the ozone contact reactor through a fluidized bed arrangement. Through water flow and air flow control, the catalyst is maintained at a fluidized state. The catalyst can be recovered by precipitation or filtration.

Embodiment 8

The advanced treatment method for water by a combination of metal zinc and ozone according to this embodiment is realized by the following steps: placing metal zinc into an ozone contact reactor; and introducing water subject to treatment into the ozone contact reactor at a flow rate of 20 m/h while at the same introducing ozone to the water subject to treatment so that the ozone, the metal zinc and the water subject to treatment are contacted adequately, wherein a hydraulic retention time of the water subject to treatment in the ozone contact reactor is 30 min, an amount of the ozone which is introduced into the water subject to treatment is 10 mg per liter of the water subject to treatment, and the metal zinc has a strip-like structure having a width of 5 cm and a thickness of 0.5 cm.

According to this embodiment, the metal zinc is placed into the ozone contact reactor through a fixed-bed arrangement and is continuously provided in the reactor. The ozone contact reactor is a tubular reactor, a tank reactor or a tower reactor, wherein an amount of metal zinc is 1000 g per liter of the water subject to treatment.

According to this embodiment, the water subject to treatment is guided to flow into the reactor in a cocurrent manner, a countercurrent manner or a mixture of concurrent and countercurrent manner.

According to this embodiment, water after treatment is analyzed by a zinc ion analyzer and the test result shows that the water after treatment does not contain zinc ion. According to this embodiment, the ion dissolution problem does not exist and the water after treatment is clear and transparent with good sensory properties.

In the water subject to treatment of this embodiment, the nitrobenzene concentration is 0.8 mg/L, the p-chlorobenzoic acid concentration is 1 mg/L, the diethyl phthalate concentration is 0.5 mg/L, the dibutyl phthalate concentration is 0.65 mg/L and the p-chloronitrobenzene concentration is 0.89 mg/L. According to this embodiment, a removal efficiency of nitrobenzene is 98%, a removal efficiency of p-chlorobenzoic acid is 95.6%, a removal efficiency of diethyl phthalate is 98.9%, a removal efficiency of dibutyl phthalate is 96.8%, and a removal efficiency of p-chloronitrobenzene is 97.2%. The efficiency of advanced treatment method for water according to this embodiment is good. Compared to conventional ozonation method, the removal efficiency of nitrobenzene is increased by 69%, the removal efficiency of p-chlorobenzoic acid is increased by 87%, the removal efficiency of diethyl phthalate is increased by 99%, the removal efficiency of dibutyl phthalate is increased by 65%, and the removal efficiency of p-chloronitrobenzene is increased by 80%.

Embodiment 9

The advanced treatment method for water by a combination of metal zinc and ozone according to this embodiment is realized by the following steps: placing metal zinc into an ozone contact reactor; and introducing water subject to treatment into the ozone contact reactor at a flow rate of 30 m/h while at the same introducing ozone to the water subject to treatment so that the ozone, the metal zinc and the water subject to treatment are contacted adequately, wherein a hydraulic retention time of the water subject to treatment in the ozone contact reactor is 50 min, an amount of the ozone which is introduced into the water subject to treatment is 6 mg per liter of the water subject to treatment, and the metal zinc has a strip-like structure having a width of 1 cm and a thickness of 0.2 cm and is woven into a mesh structure having a grid size of 2 cm$^2$.

According to this embodiment, the metal zinc is placed into the ozone contact reactor through a fixed-bed arrangement (spacedly provided at a vertical interval of 5 cm in the reactor). The ozone contact reactor is a tubular reactor, a tank reactor or a tower reactor, wherein an amount of metal zinc is 500 g per liter of the water subject to treatment.

According to this embodiment, the water subject to treatment is guided to flow into the reactor in a cocurrent manner, a countercurrent manner or a mixture of concurrent and countercurrent manner.

According to this embodiment, water after treatment is analyzed by a zinc ion analyzer and the test result shows that the water after treatment does not contain zinc ion. According to this embodiment, the ion dissolution problem does not exist and the water after treatment is clear and transparent with good sensory properties.

In the water subject to treatment of this embodiment, the nitrobenzene concentration is 0.2 mg/L, the p-chlorobenzoic acid concentration is 0.3 mg/L, the diethyl phthalate concentration is 0.2 mg/L, the dibutyl phthalate concentration is 0.1 mg/L and the p-chloronitrobenzene concentration is 0.2 mg/L. According to this embodiment, a removal efficiency of nitrobenzene, p-chlorobenzoic acid, diethyl phthalate, dibutyl phthalate and p-chloronitrobenzene from the water subject to treatment can reach 90% or above. The efficiency of advanced treatment method for water according to this embodiment is good.

Embodiment 10

The advanced treatment method for water by a combination of metal zinc and ozone according to this embodiment is realized by the following steps: placing metal zinc into an ozone contact reactor; and introducing water subject to treatment into the ozone contact reactor at a flow rate of 40 m/h while at the same introducing ozone to the water subject to treatment so that the ozone, the metal zinc and the water subject to treatment are contacted adequately, wherein a hydraulic retention time of the water subject to treatment in the ozone contact reactor is 30 min, an amount of the ozone which is introduced into the water subject to treatment is 4 mg per liter of the water subject to treatment, and the metal zinc has a thread-like structure having a diameter of 0.4 mm and is woven into a mesh structure having a grid size of 1 cm$^2$.

According to this embodiment, the metal zinc is placed into the ozone contact reactor through a fixed-bed arrangement (continuous fixed-bed arrangement). The ozone contact reactor is a tank reactor.

According to this embodiment, the water subject to treatment is guided to flow into the reactor in a cocurrent manner, a countercurrent manner or a mixture of concurrent and countercurrent manner.

According to this embodiment, water after treatment is analyzed by a zinc ion analyzer and the test result shows that the water after treatment does not contain zinc ion. According to this embodiment, the ion dissolution problem does not exist and the water after treatment is clear and transparent with good sensory properties.

In the water subject to treatment of this embodiment, the nitrobenzene concentration is 0.12 mg/L, the p-chlorobenzoic acid concentration is 0.16 mg/L, the diethyl phthalate concentration is 0.18 mg/L, the dibutyl phthalate concentration is 0.22 mg/L and the p-chloronitrobenzene concentration is 0.15 mg/L. According to this embodiment, a removal efficiency of nitrobenzene is 96%, a removal efficiency of p-chlorobenzoic acid is 93%, a removal efficiency of diethyl phthalate is 98%, a removal efficiency of dibutyl phthalate is 94%, and a removal efficiency of p-chloronitrobenzene is 94%. The efficiency of advanced treatment method for water according to this embodiment is good. Compared to conventional ozonation method, the removal efficiency of nitrobenzene is increased by 70%, the removal efficiency of p-chlorobenzoic acid is increased by 82%, the removal efficiency of diethyl phthalate is increased by 92%, the removal efficiency of dibutyl phthalate is increased by 67%, and the removal efficiency of p-chloronitrobenzene is increased by 81%.

Embodiment 11

The advanced treatment method for water by a combination of metal zinc and ozone according to this embodiment is realized by the following steps: placing metal zinc into an ozone contact reactor; and introducing water subject to treatment into the ozone contact reactor at a flow rate of 45 m/h while at the same introducing ozone to the water subject to treatment so that the ozone, the metal zinc and the water subject to treatment are contacted adequately, wherein a hydraulic retention time of the water subject to treatment in the ozone contact reactor is 100 min, an amount of the ozone which is introduced into the water subject to treatment is 5 mg per liter of the water subject to treatment, and the metal zinc has a granular structure having a grain size of 1 cm, wherein an amount of metal zinc is 10~1000 g per liter of the water subject to treatment.

According to this embodiment, the metal zinc is placed into the ozone contact reactor through a fixed-bed arrangement (continuous fixed-bed arrangement). The ozone contact reactor is a tank reactor.

According to this embodiment, the water subject to treatment is guided to flow into the reactor in a cocurrent manner, a countercurrent manner or a mixture of concurrent and countercurrent manner.

According to this embodiment, water after treatment is analyzed by a zinc ion analyzer and the test result shows that the water after treatment does not contain zinc ion. According to this embodiment, the ion dissolution problem does not exist and the water after treatment is clear and transparent with good sensory properties.

According to this embodiment, a removal efficiency of nitrobenzene, p-chlorobenzoic acid, diethyl phthalate, dibutyl phthalate and p-chloronitrobenzene from the water subject to treatment can reach 90% or above. The efficiency of advanced treatment method for water according to this embodiment is good. Compared to conventional ozonation method, the removal efficiency of nitrobenzene is increased by 69%, the removal efficiency of p-chlorobenzoic acid is increased by 87%, the removal efficiency of diethyl phthalate is increased by 95%, the removal efficiency of dibutyl phthalate is increased by 65%, and the removal efficiency of p-chloronitrobenzene is increased by 79%.

Embodiment 12

The embodiment 12 and the embodiment 11 have identical steps and parameters except that in the embodiment 12, an amount of metal zinc is 100~900 g per liter of the water subject to treatment.

Embodiment 13

The embodiment 13 and the embodiment 11 have identical steps and parameters except that in the embodiment 13, an amount of metal zinc is 200~800 g per liter of the water subject to treatment.

Embodiment 14

The embodiment 14 and the embodiment 11 have identical steps and parameters except that in the embodiment 14, an amount of metal zinc is 700 g per liter of the water subject to treatment.

According to this embodiment, the metal zinc is placed into the ozone contact reactor through a fixed-bed arrangement (spacedly provided at a horizontal interval of 10 cm). The ozone contact reactor is a tank reactor.

According to this embodiment, the water subject to treatment is guided to flow into the reactor in a countercurrent manner.

According to this embodiment, water after treatment is analyzed by a zinc ion analyzer and the test result shows that the water after treatment does not contain zinc ion. According to this embodiment, the ion dissolution problem does not exist and the water after treatment is clear and transparent with good sensory properties.

In the water subject to treatment of this embodiment, the nitrobenzene concentration is 0.96 mg/L, the p-chlorobenzoic acid concentration is 0.56 mg/L, the diethyl phthalate concentration is 1.1 mg/L, the dibutyl phthalate concentration is 0.22 mg/L and the p-chloronitrobenzene concentration is 0.45 mg/L. According to this embodiment, a removal efficiency of nitrobenzene is 96%, a removal efficiency of p-chlorobenzoic acid is 99%, a removal efficiency of diethyl phthalate is 97.6%, a removal efficiency of dibutyl phthalate is 98.9%, and a removal efficiency of p-chloronitrobenzene is 99.5%. The efficiency of advanced treatment method for water according to this embodiment is good. Compared to conventional ozonation method, the removal efficiency of nitrobenzene is increased by 69%, the removal efficiency of p-chlorobenzoic acid is increased by 86%, the removal efficiency of diethyl phthalate is increased by 93%, the removal efficiency of dibutyl phthalate is increased by 65%, and the removal efficiency of p-chloronitrobenzene is increased by 80%.

Embodiment 15

The embodiment 15 and the embodiment 11 have identical steps and parameters except that in the embodiment 15, the metal zinc has a granular structure having a grain size of 1 mm and an amount of metal zinc is 500 g per liter of the water subject to treatment.

According to this embodiment, the metal zinc is placed into the ozone contact reactor through a fluidized-bed arrangement, the ozone contact reactor is a tank reactor, the catalyst maintains its fluidized state by water and air flow control, the catalyst is recovered by precipitation or filtration.

According to this embodiment, the water subject to treatment is guided to flow into the reactor in a cocurrent manner.

According to this embodiment, water after treatment is analyzed by a zinc ion analyzer and the test result shows that the water after treatment does not contain zinc ion. According to this embodiment, the ion dissolution problem does not exist and the water after treatment is clear and transparent with good sensory properties.

In the water subject to treatment of this embodiment, the nitrobenzene concentration is 0.6 mg/L, the p-chlorobenzoic acid concentration is 0.3 mg/L, the diethyl phthalate concentration is 0.56 mg/L, the dibutyl phthalate concentration is 0.12 mg/L and the p-chloronitrobenzene concentration is 0.35 mg/L. According to this embodiment, a removal efficiency of nitrobenzene is 96%, a removal efficiency of p-chlorobenzoic acid is 97.9%, a removal efficiency of diethyl phthalate is 99.9%, a removal efficiency of dibutyl phthalate is 95.6%, and a removal efficiency of p-chloronitrobenzene is 96.8%. The efficiency of advanced treatment method for water according to this embodiment is good. Compared to conventional ozonation, method, the removal efficiency of nitrobenzene is increased by 70%, the removal efficiency of p-chlorobenzoic acid is increased by 84%, the removal efficiency of diethyl phthalate is increased by 93%, the removal efficiency of dibutyl phthalate is increased by 65%, and the removal efficiency of p-chloronitrobenzene is increased by 76%.

Embodiment 16

The advanced treatment method for water by a combination of metal zinc and ozone according to this embodiment is realized by the following steps: placing metal zinc into an ozone contact reactor; and introducing water subject to treatment into the ozone contact reactor at a flow rate of 35 m/h while at the same introducing ozone to the water subject to treatment so that the ozone, the metal zinc and the water subject to treatment are contacted adequately, wherein a hydraulic retention time of the water subject to treatment in the ozone contact reactor is 150 min, an amount of the ozone which is introduced into the water subject to treatment is 3 mg per liter of the water subject to treatment, the metal zinc has a powder structure having a particle size of 100 μm, and an amount of metal zinc is 1 mg~10 g per liter of the water subject to treatment.

According to this embodiment, the catalyst is placed into the ozone contact reactor through a fluidized bed arrangement. Through water flow and air flow control, the catalyst is maintained at a fluidized state. The catalyst can be recovered by precipitation or filtration.

According to this embodiment, a removal efficiency of nitrobenzene, p-chlorobenzoic acid, diethyl phthalate, dibutyl phthalate and p-chloronitrobenzene from the water subject to treatment can reach 90% or above. The efficiency of advanced treatment method for water according to this embodiment is good. Compared to conventional ozonation method, the removal efficiency of nitrobenzene is increased by 69%, the removal efficiency of p-chlorobenzoic acid is increased by 87%, the removal efficiency of diethyl phthalate is increased by 99%, the removal efficiency of dibutyl phthalate is increased by 65%, and the removal efficiency of p-chloronitrobenzene is increased by 80%.

Embodiment 17

The embodiment 17 and the embodiment 16 have identical steps and parameters except that in the embodiment 17, an amount of metal zinc is 40~900 mg per liter of the water subject to treatment.

Embodiment 18

The embodiment 18 and the embodiment 16 have identical steps and parameters except that in the embodiment 18, an amount of metal zinc is 50~800 mg per liter of the water subject to treatment.

Embodiment 19

The embodiment 19 and the embodiment 16 have identical steps and parameters except that in the embodiment 19, an amount of metal zinc is 70 mg per liter of the water subject to treatment.

According to this embodiment, the water subject to treatment is guided to flow into the reactor in a mixture of concurrent and countercurrent manner. Through water flow and air flow control, the catalyst is maintained at a fluidized state. The catalyst can be recovered by precipitation or filtration.

In the water subject to treatment of this embodiment, the nitrobenzene concentration is 0.1 mg/L, the p-chlorobenzoic acid concentration is 0.1 mg/L, the diethyl phthalate concentration is 0.2 mg/L, the dibutyl phthalate concentration is 0.05 mg/L and the p-chloronitrobenzene concentration is 0.12 mg/L. According to this embodiment, a removal efficiency of nitrobenzene is 96.9%, a removal efficiency of p-chlorobenzoic acid is 99%, a removal efficiency of diethyl phthalate is 97.6%, a removal efficiency of dibutyl phthalate is 99.6%, and a removal efficiency of p-chloronitrobenzene is 94.8%. The efficiency of advanced treatment method for water according to this embodiment is good. Compared to conventional ozonation method, the removal efficiency of nitrobenzene is increased by 70%, the removal efficiency of p-chlorobenzoic acid is increased by 84%, the removal efficiency of diethyl phthalate is increased by 93%, the removal efficiency of dibutyl phthalate is increased by 65%, and the removal efficiency of p-chloronitrobenzene is increased by 76%.

Embodiment 20

The embodiment 20 and the embodiment 16 have identical steps and parameters except that in the embodiment 20, an amount of metal zinc is 500 mg per liter of the water subject to treatment.

According to this embodiment, the water subject to treatment is guided to flow into the reactor in a concurrent manner. Through water flow and air flow control, the catalyst is maintained at a fluidized state. The catalyst can be recovered by precipitation or filtration.

In the water subject to treatment of this embodiment, the nitrobenzene concentration is 0.24 mg/L, the p-chlorobenzoic acid concentration is 0.14 mg/L, the diethyl phthalate concentration is 0.25 mg/L, the dibutyl phthalate concentration is 0.11 mg/L and the p-chloronitrobenzene concentration is 0.06 mg/L. According to this embodiment, a removal efficiency of nitrobenzene is 97.6%, a removal efficiency of p-chlorobenzoic acid is 94.9%, a removal efficiency of diethyl phthalate is 98.7%, a removal efficiency of dibutyl phthalate is 92%, and a removal efficiency of p-chloronitrobenzene is 99%. The efficiency of advanced treatment method for water according to this embodiment is good. Compared to conventional ozonation method, the removal efficiency of nitrobenzene is increased by 71%, the removal efficiency of p-chlorobenzoic acid is increased by 85%, the removal efficiency of diethyl phthalate is increased by 95%, the removal efficiency of dibutyl phthalate is increased by 69%, and the removal efficiency of p-chloronitrobenzene is increased by 78%.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An advanced treatment method for water by combination of zinc and ozone, comprising the steps of:
    placing metal consisting essentially of a piece or pieces of unsupported zinc metal into an ozone contact reactor; and
    introducing water subject to treatment into the ozone contact reactor at a flow rate of 1~50 m/h while at the same time introducing ozone into the water subject to treatment so that the ozone, the metal zinc and the water subject to treatment are contacted adequately, wherein a hydraulic retention time of the water subject to treatment in the ozone contact reactor is 1~200 min and an amount of the ozone which is introduced into the water subject to treatment is 0.1-100 mg per liter of the water subject to treatment, wherein the treated water is essentially free of zinc ions caused by said advanced treatment method for water.

2. The advanced treatment method for water by a combination of zinc and ozone, as recited in claim 1, wherein the hydraulic retention time of the water subject to treatment in the ozone contact reactor is 30~120 min.

3. The advanced treatment method for water by a combination of zinc and ozone, as recited in claim 1, wherein the piece or pieces of zinc metal have a strip-shaped structure having a width of 1 cm~10 cm and a thickness of 1 mm~1 cm, wherein an amount of zinc is 10~2000 g per liter of the water subject to treatment.

4. The advanced treatment method for water by a combination of metal zinc and ozone, as recited in claim 1, wherein the piece or pieces of zinc metal have a strip-shaped structure having a width of 1 cm~10 cm and a thickness of 1 mm~1 cm and is woven into a mesh structure having a grid size of 1 $cm^2$~100 $cm^2$, wherein an amount of zinc is 10~2000 g per liter of the water subject to treatment.

5. The advanced treatment method for water by a combination of zinc and ozone, as recited in claim 1, wherein the piece or pieces of zinc metal have a thread-shaped structure having a diameter of 1 μm~1 cm and is woven into a mesh structure having a grid size of 1 $mm^2$~100 $cm^2$, wherein an amount of metal zinc is 1~1000 g per liter of the water subject to treatment.

6. The advanced treatment method for water by a combination of zinc and ozone, as recited in claim 1, wherein the piece or pieces of zinc metal have a granular structure having a grain size of 1 mm~10 cm, wherein an amount of zinc is 1-1000 g per liter of the water subject to treatment.

7. The advanced treatment method for water by a combination of zinc and ozone, as recited in claim 1, wherein the piece or pieces of zinc metal have a powder structure having a particle size of 10 μm~1 mm, wherein an amount of zinc is 1 mg-10 g per liter of the water subject to treatment.

8. The advanced treatment method for water by a combination of zinc and ozone, as recited in claim 2, wherein the piece or pieces of zinc metal have a strip-shaped structure having a width of 1 cm~10 cm and a thickness of 1 mm~1 cm, wherein an amount of zinc is 10~2000 g per liter of the water subject to treatment.

9. The advanced treatment method for water by a combination of metal zinc and ozone, as recited in claim 2, wherein the piece or pieces of zinc metal have a strip-shaped structure having a width of 1 cm~10 cm and a thickness of 1 mm~1 cm and is woven into a mesh structure having a grid size of 1 $cm^2$~100 $cm^2$, wherein an amount of zinc is 10~2000 g per liter of the water subject to treatment.

10. The advanced treatment method for water by a combination of zinc and ozone, as recited in claim 2, wherein the piece or pieces of zinc metal have a thread-shaped structure having a diameter of 1 μm~1 cm and is woven into a mesh structure having a grid size of 1 $mm^2$~100 $cm^2$, wherein an amount of metal zinc is 1~1000 g per liter of the water subject to treatment.

11. The advanced treatment method for water by a combination of zinc and ozone, as recited in claim 2, wherein the piece or pieces of zinc metal have a granular structure having a grain size of 1 mm~10 cm, wherein an amount of zinc is 1-1000 g per liter of the water subject to treatment.

12. The advanced treatment method for water by a combination of zinc and ozone, as recited in claim 2, wherein the piece or pieces of zinc metal have a powder structure having a particle size of 10 μm~1 mm, wherein an amount of zinc is 1 mg-10 g per liter of the water subject to treatment.

13. An advanced treatment method for water by combination of zinc and ozone in the absence of other metals, comprising the steps of
    placing metal consisting essentially of a piece or pieces of unsupported zinc metal into an ozone contact reactor; and introducing water subject to treatment into the ozone contact reactor at a flow rate of 1~50 m/h while at the same time introducing ozone to the water subject to treatment so that the ozone, the metal zinc and the water subject to treatment are contacted adequately, wherein a hydraulic retention time of the water subject to treatment in the ozone contact reactor is 1~200 min and an amount of the ozone which is introduced into the water subject to treatment is 0.1-00 mg per liter of the water subject to treatment,
wherein the treated water is essentially free of zinc ions and a removal rate of 90% or above for removal nitrobenzene, chlorobenzoic acid, diethyl phthalate, dibutyl phthalate and p-choronitrobenzene is obtained.

* * * * *